(12) United States Patent
Mills et al.

(10) Patent No.: US 7,128,176 B1
(45) Date of Patent: Oct. 31, 2006

(54) STAGGERED BOGIE WHEEL TRACK SUSPENSION

(75) Inventors: Andrew Mills, Roseau, MN (US); Guy L. Sibilleau, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 11/010,155

(22) Filed: Dec. 10, 2004

(51) Int. Cl.
*B62M 27/02* (2006.01)

(52) U.S. Cl. .................. 180/9.1; 180/190; 305/167

(58) Field of Classification Search .......... 180/9.1, 180/9.5, 190; 305/126, 127, 128, 129, 167
See application file for complete search history.

(56) References Cited

U.S. PATENT DOCUMENTS

| | | | |
|---|---|---|---|
| 2,303,945 A | * | 12/1942 | Mayne et al. ............... 305/100 |
| 2,936,196 A | * | 5/1960 | Lala et al. .................. 305/167 |
| 3,658,145 A | | 4/1972 | Bergmann et al. |
| 3,703,936 A | | 11/1972 | Padwick et al. |
| 3,717,211 A | | 2/1973 | Carter |
| 3,750,774 A | | 8/1973 | Trapp |
| 3,773,126 A | | 11/1973 | Irvine |
| 3,788,412 A | | 1/1974 | Vincent |
| 3,830,323 A | | 8/1974 | Vuolevi |
| 3,877,534 A | | 4/1975 | Krause |
| 3,948,331 A | | 4/1976 | Esch |
| 4,052,111 A | | 10/1977 | Baker |
| 4,301,884 A | | 11/1981 | Taylor |
| 6,510,913 B1 | | 1/2003 | Morin et al. |
| 2003/0047368 A1 | | 3/2003 | Morin et al. |
| 2005/0179318 A1 | | 8/2005 | Paradis |

* cited by examiner

*Primary Examiner*—Kevin Hurley
(74) *Attorney, Agent, or Firm*—Baker & Daniels LLP

(57) ABSTRACT

Suspension wheels, or bogie wheels, in an endless track vehicle are longitudinally offset, or staggered, from one another in such a way as to cause the track rods of the endless track to impact only one suspension wheel at any given point in time.

46 Claims, 11 Drawing Sheets

STAGGERED BOGIE WHEEL TRACK SUSPENSION

FIELD

The disclosure relates to suspension systems for endless track vehicles. In several embodiments, the disclosure focuses on a drive track suspension system for a snowmobile.

BACKGROUND

Snowmobiles are popular land vehicles used as transportation vehicles or as recreational vehicles in cold and snowy conditions. In general, a snowmobile has a central frame or chassis on or around which the various components of the snowmobile are assembled. Typical snowmobiles include skis for steering, a seat, handlebars, and an endless track for propulsion mounted to a central chassis. An engine cradle or bulkhead is defined by a plurality of front structural members of the chassis. The engine drives a ground-engaging endless track disposed in a longitudinally extending drive tunnel formed within the chassis. The skis serve to facilitate steering as well as to provide flotation of the front of the snowmobile over the snow in which it is operated. The skis are mounted at the front body portion of the chassis. A handlebar assembly, positioned forward of the seat, is operatively linked to the skis for steering the snowmobile. The skis may be pivoted laterally to steer the snowmobile, for example, by turning the handlebars.

Snowmobiles typically have a front steering ski and an endless drive track carried by a subframe rearwardly of the ski, with the subframe being resiliently suspended from the main frame of the snowmobile. The track suspension system of a snowmobile is important because it determines, at least to some extent, the vehicle's shock-absorbing capability, stability, handling, traction, and power requirements.

Snowmobile track suspension systems are of three general types. One type is a bogie wheel suspension, in which sets of bogie wheels are carried by axles mounted on a resiliently suspended subframe to engage the lower run of the drive track so as to tend to maintain the track in driving engagement with the snow. The bogie wheel suspension system involves mostly rolling friction, with very little sliding friction between the bogie wheels and the track, thereby requiring little, if any, lubrication. Typical bogie wheel suspensions are shown, for example, in U.S. Pat. Nos. 3,773,126 and 3,658,145.

A second type of track suspension system is the slide rail suspension, in which the lower run of the drive track travels in sliding engagement with a pair of longitudinally extending rails. Snow acts as a lubricant between the track and rails to reduce friction. The slide rail suspension tends to hold the track flatter against the snow in rough or variable terrain, which can be important when speed or power is required, such as in racing. Typical slide rail suspensions are shown, for example, in U.S. Pat. Nos. 3,690,394, 3,738,714, 3,974,890, and 3,758,170.

A third type of track suspension system is a combination of the slide rail and bogie wheel suspensions in a single subframe assembly. Bogie wheels act to hold at least portions of the lower run of the track away from the slide rail to reduce sliding friction.

In most known track suspension systems of either the bogie wheel, slide rail, or combination type, the bogie wheels and slide rails are carried by a subframe which is resiliently suspended from the snowmobile's main frame so as to provide shock-absorbing capability and thereby isolate the main frame from terrain-induced shock. The track on such subframes is driven by a at least one drive sprocket mounted on a drive axle. The drive axle is carried by the main frame of the snowmobile, as shown in the aforementioned patents. While the track drive axle and sprockets are located at one end of the track, there is usually an idler axle carrying a set of idler wheels or guide wheels at the opposite end of the track. The idler axle may be carried by either the subframe or the main frame. Additionally, carrier wheels may be positioned in an upper portion of the subframe to further guide the track in its path around the subframe. Therefore, the resilient means which suspends the subframe from the main frame does not isolate the entire length of the track from the main frame, resulting in some shock and vibration being transmitted through the fore and aft portions of the track and its axles to the main frame.

The drive track assembly comprises an endless track (a continuous loop of material) with an outer surface for engagement with the ground and a plurality of track rods. The track rods are spaced longitudinally along the endless track such that movement of the endless track as it provides vehicle propulsion causes the track rods to repeatedly impact the bogie wheels as they move relative to each other. This may occur on track suspension systems of the bogie wheel or combination bogie wheel/slide rail type. Each instance of a bogie wheel traveling over a track rod causes a jarring force or impact to the wheel that creates unwanted noise and vibration, which can be transmitted to the main frame (and hence, to the operators and passengers), as described above. Additionally, each instance of a track rod moving over a carrier wheel may cause similar noise and vibration.

The effect of the noise and vibration from track rods impacting bogie wheels and/or carrier wheels may be compounded in many snowmobile suspensions, due to the positioning of such wheels in symmetric pairs along the longitudinal axis. Thus, in typical snowmobile suspensions, there is an additive effect of the noise caused by having two or more bogie wheels and/or carrier wheels impacting track rods at the same instant in time. The simultaneous occurrence of wheels impacting track rods creates a repetitive "jarring" noise component that may be unpleasant to snowmobile operators and passengers, and which may reduce drive-train efficiency (and hence performance) of the snowmobile.

BRIEF SUMMARY

In a first embodiment of the invention, a drive track suspension system for an endless track vehicle is provided for reducing noise and vibration and for increasing drivetrain efficiency.

A further embodiment of the invention provides a drive track suspension system for a snowmobile that reduces noise and vibration and increases drivetrain efficiency.

Another embodiment of the invention provides a snowmobile drive track suspension system with longitudinally offset bogie wheels (suspension wheels).

In another embodiment of the invention, a snowmobile drive track suspension system is provided having longitudinally spaced drive track rods that impact no more than one bogie wheel at any given point in time during movement around an endless track unit.

Yet a further embodiment of the invention provides a snowmobile drive track suspension system with longitudinally offset bogie wheels such that longitudinally spaced drive track rods impact no more than one bogie wheel at any given point in time, and are further arranged to prevent harmonic addition of noise from distinct bogie wheels.

In a further embodiment of the invention, a method of reducing noise and vibration in an endless track vehicle by staggering the bogie wheels longitudinally is provided in which the longitudinal spacing between any two bogie wheels, when divided by the rod spacing, forms a quotient having a phase difference, the phase difference being unique as compared to the phase differences obtained by dividing the longitudinal spacing of all other combinations of two bogie wheels by the track rod spacing.

DETAILED DESCRIPTION

Figure 1:
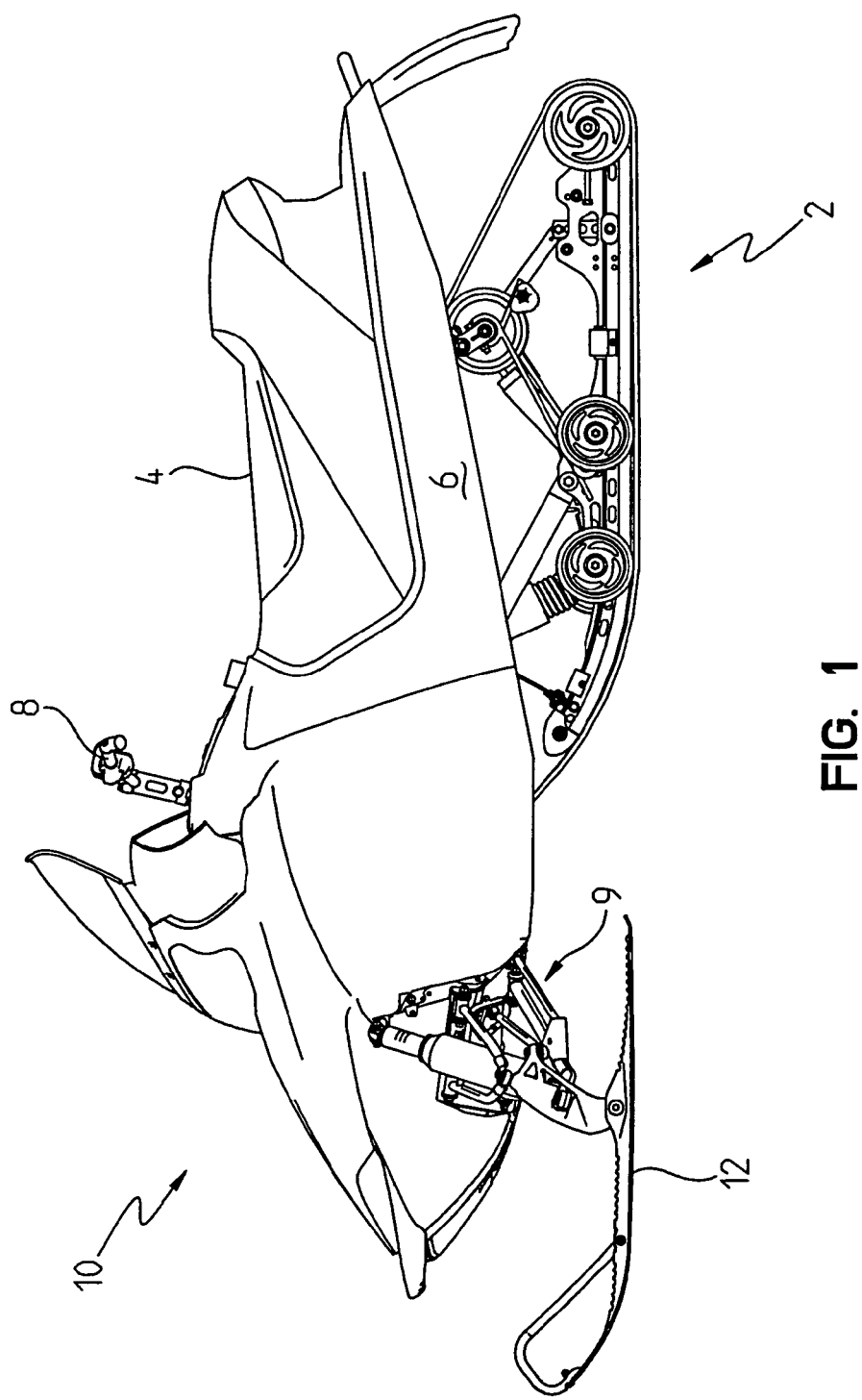
FIG. 1 shows a side view of a snowmobile.

The following detailed description should be read with reference to the drawings, in which like elements in different drawings are numbered identically. The drawings depict selected embodiments and are not intended to limit the scope of the invention. It will be understood that embodiments shown in the drawings and described above are merely for illustrative purposes, and are not intended to limit the scope of the invention as defined in the claims that follow. Although the following description and corresponding drawings illustrate embodiments of the invention having staggered bogie wheels, a person skilled in the art will recognize that other embodiments may include other staggered or offset wheels, such as staggered carrier wheels, and will fall within the scope of the invention.

Referring to FIG. 1, a snowmobile 10 is depicted as having an endless track unit 2, a seat 4, a chassis 6, a handlebar 8, a pair of steerable front skis 12, and a front suspension system 9 for the attachment and support of the snowmobile chassis 6 relative to the skis 12.

Figure 2:
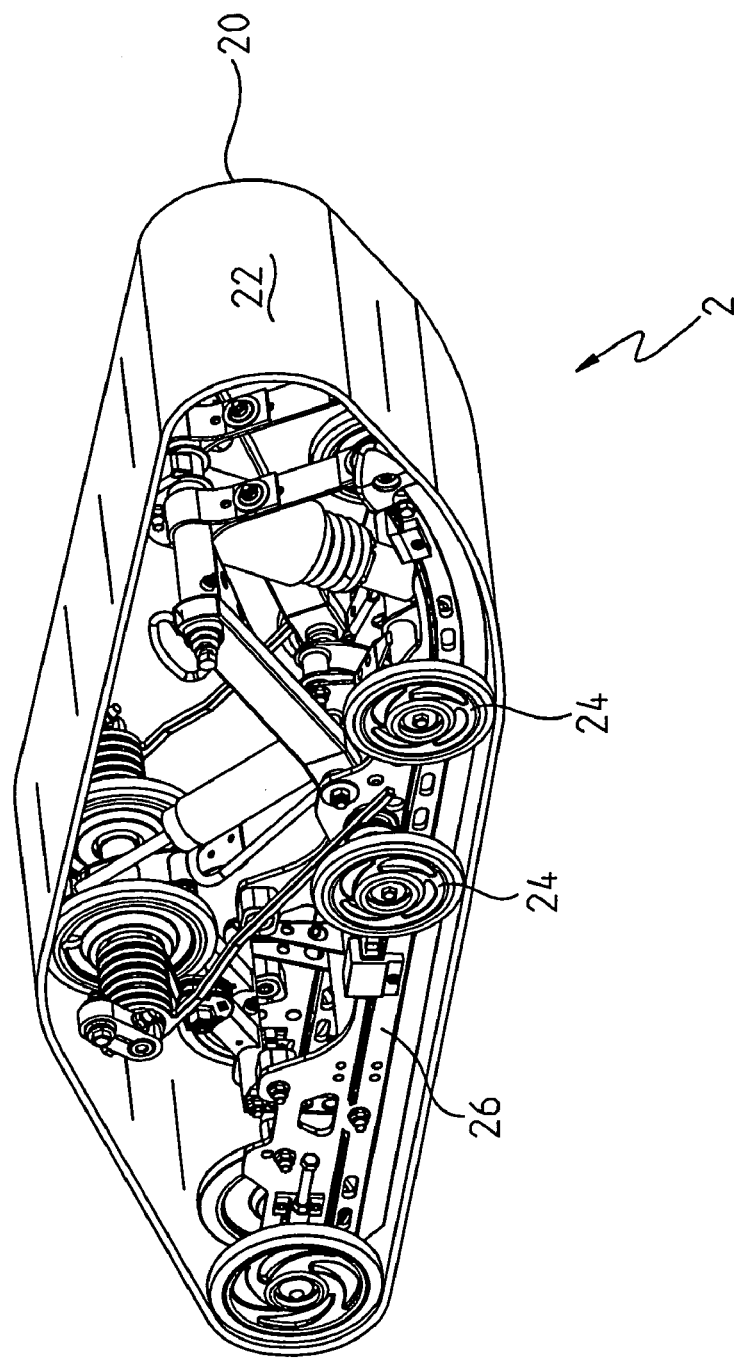
FIG. 2 shows a perspective view of an endless track unit for a snowmobile according to an embodiment of the invention.

FIG. 2 shows an endless track unit 2 for a snowmobile 10. Endless track unit 2 includes endless track 20, one or more suspension rails 26 (only one shown in FIG. 2), and a plurality of bogie wheels 24. Idler wheels 25 provide support to endless track 20 at a rearward portion of endless track unit 2. Similarly, carrier wheels 27 provide support to endless track 20 at an upper portion of endless track unit 2. Endless track 20 forms a continuous path about the endless track unit 2, having an outer surface 22, which acts as a ground-engaging member for providing propulsion for the snowmobile 10.

Figure 3:
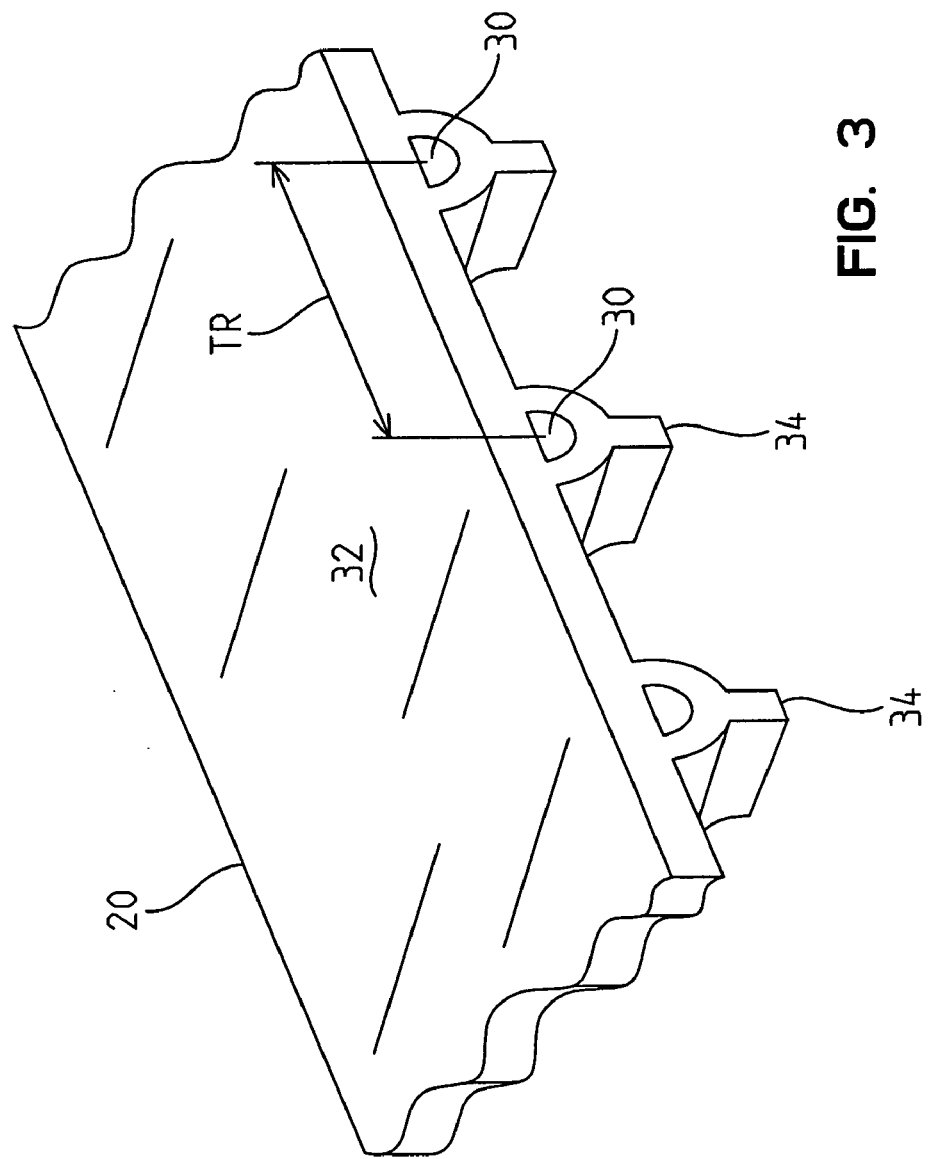
FIG. 3 shows an enlarged perspective view of a portion of an endless track for an endless track vehicle in accordance with an embodiment of the invention.

FIG. 3 is an enlarged perspective view of a portion of endless track 20, showing the inner surface 32, and a plurality of track rods 30 and track lugs 34 spaced longitudinally along endless track 20 and protruding from the outer surface of endless track 20.

During normal movement of snowmobile 10, bogie wheels 24 (FIG. 2) are in rolling contact with inner surface 32 of endless track 20 to maintain endless track 20 in driving engagement with the snow. The movement of endless track 20 with respect to the bogie wheels causes the track rods 30 to periodically align directly beneath a bogie wheel, resulting in an impact which generates noise and vibration. The longitudinal spacing TR of the track rods 30 is a factor that affects the noise and vibration generated by the track rod-to-bogie wheel impact.

Figure 4:
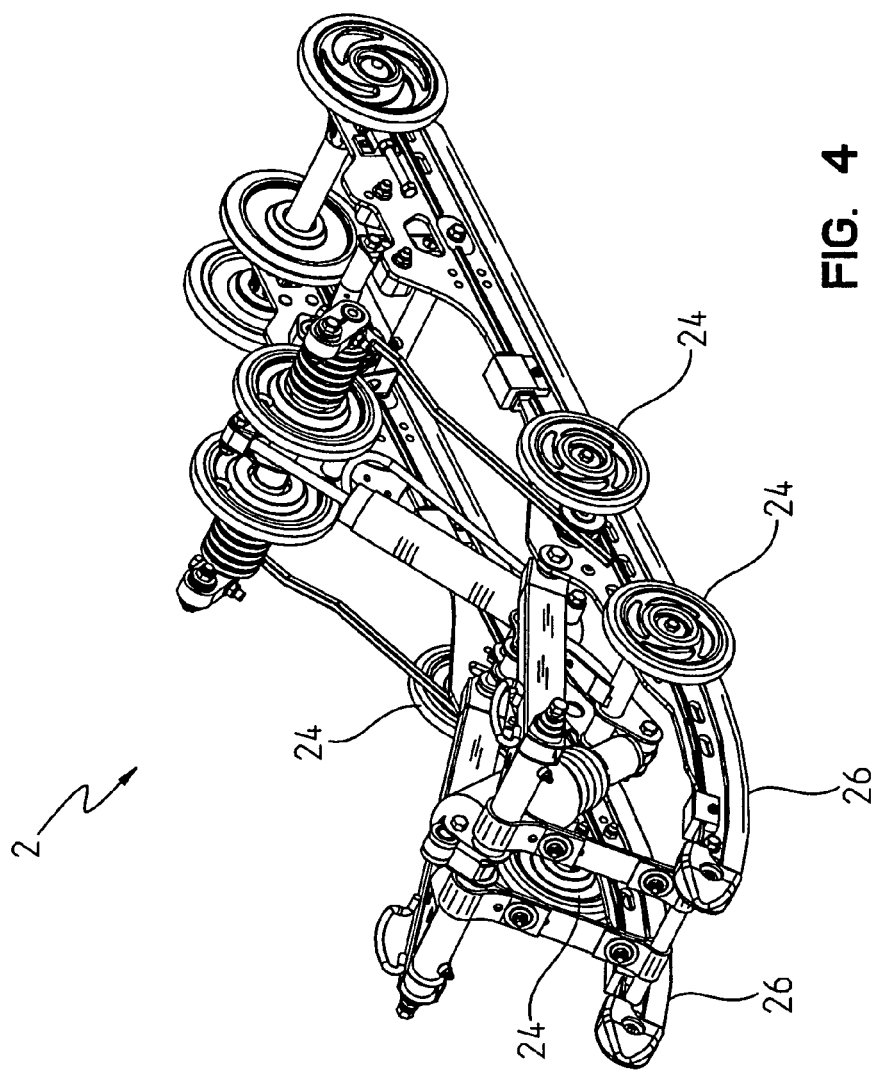
FIG. 4 shows a top left perspective view of an endless track unit for a snowmobile according to an embodiment of the invention.

FIG. 4 is a top left perspective view of an endless track unit 2 with endless track 20 removed to show additional details. As shown in FIG. 4, bogie wheels 24 may be positioned longitudinally along suspension rails 26. In one embodiment, a bogie wheel suspension system comprises a pair of suspension rails 26 spaced apart laterally, with bogie wheels 24 positioned thereon to form pairs of mirror image bogie wheels 24 spaced longitudinally along the pair of suspension rails 26. Other embodiments may have a single suspension rail 26, or may include three or more suspension rails 26, as would be known by a person of ordinary skill in the art.

Figure 5A:
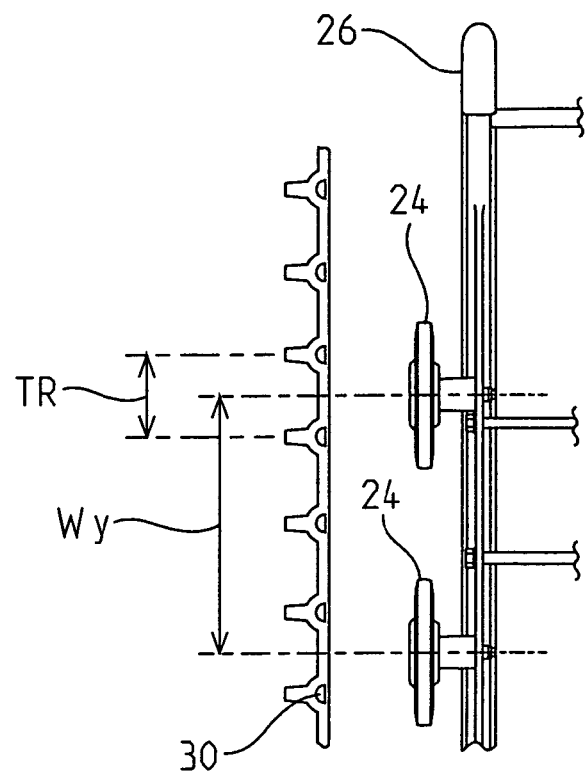
FIGS. 5 (*a*) through (*c*) show several staggered bogie wheel configurations according to embodiments of the invention.
Figure 5B:
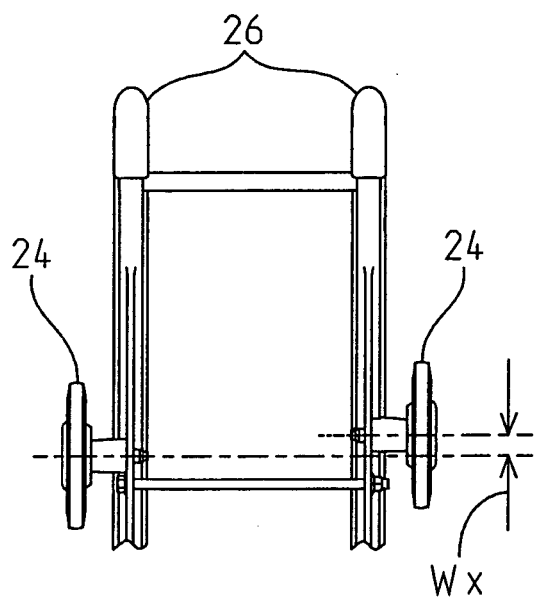

FIGS. 5(*a*)–5(*c*) show several bogie wheel configurations according to certain embodiments of the invention. FIG. 5(*a*) shows an embodiment of the invention in which two or more bogie wheels 24 are operatively connected to a suspension rail 26 such that at most, only one track rod 30 impacts a bogie wheel 24 at any point in time. Note that FIG. 5(*a*) shows a side view of the track rods 30 next to a top plan view of the bogie wheels 24 and suspension rail 26, to illustrate the longitudinal spacing of the track rods 30 with respect to the bogie wheels 24. This could be accomplished, for example, by having a longitudinal spacing $W_y$ between bogie wheels 24 that is a non-integer multiple of the track rod spacing TR between adjacent track rods 30. A more detailed discussion of wheel spacing considerations follows with respect to FIG. 7.

FIG. 5(*b*) shows an embodiment of the invention in which two suspension rails 26 each have a bogie wheel 24 operatively connected such that at most, only one track rod 30 impacts a bogie wheel 24 at any point in time. This could be accomplished, for example, by having a longitudinal spacing $W_x$ between bogie wheels 24 that is a non-integer multiple of the track rod spacing between adjacent track rods 30 (not shown). Alternately, this could be accomplished by having a longitudinal spacing or offset between bogie wheels that is a fraction of the distance between adjacent track rods 30. A more detailed discussion of wheel spacing considerations follows with respect to FIG. 7.

FIG. 5(*c*) shows an embodiment of the invention that includes aspects of the embodiments described above and shown in FIGS. 5(*a*) and (*b*). In particular, FIG. 5(*c*) shows a pair of suspension rails 26 having four bogie wheels 24A–24D rotatably mounted thereto, arranged as a front pair and a rear pair of bogie wheels. The longitudinal spacing between any two of the four bogie wheels shown in this example results in six different wheel spacing values, W1–W6. For example, the front pair of bogie wheels are longitudinally offset from each other by a front bogie wheel offset W6. Similarly, the rear pair of bogie wheels are longitudinally offset from each other by a rear bogie wheel offset W1. The longitudinal spacing between the forward most bogie wheel of the rear pair and the rearward bogie wheel of the front pair is indicated as the front-to-rear bogie wheel spacing W4. The front and rear bogie wheel offset W6, W1 and the front-to-rear bogie wheel spacing W4 may be selected to ensure that, at most, only one bogie wheel impacts a track rod at any point in time. A more detailed discussion of the wheel spacing considerations follows with respect to FIG. 7. As would be apparent to one of ordinary skill in the art, the bogie wheel and suspension rail configuration could be extended to include different numbers of suspension rails and bogie wheels from the example given without departing from the scope of the invention.

Figure 5C:
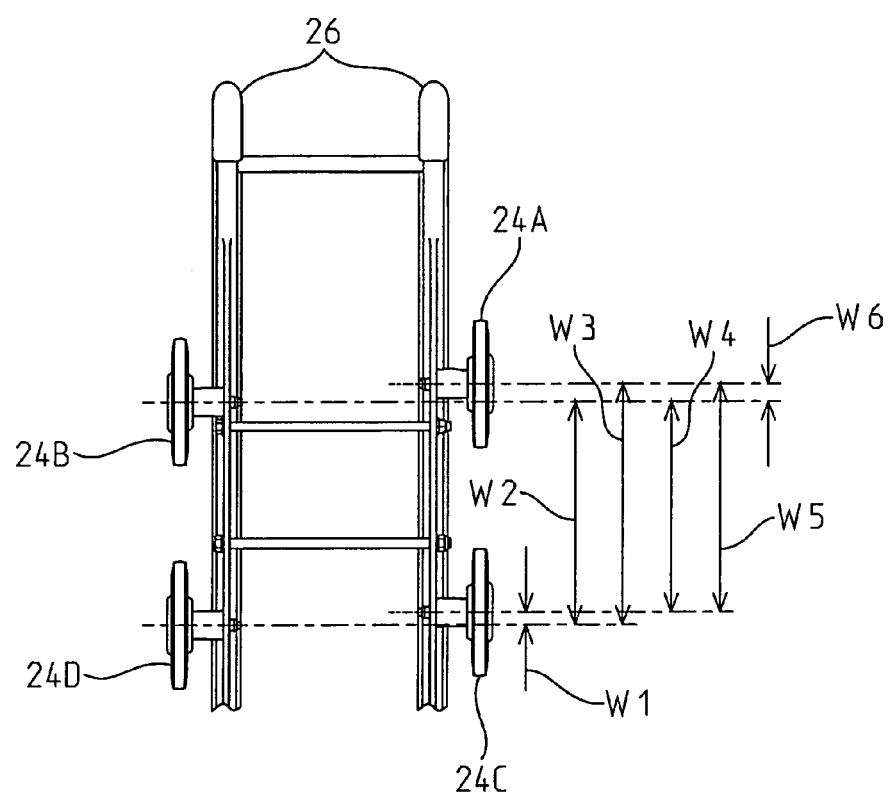
Figure 6:
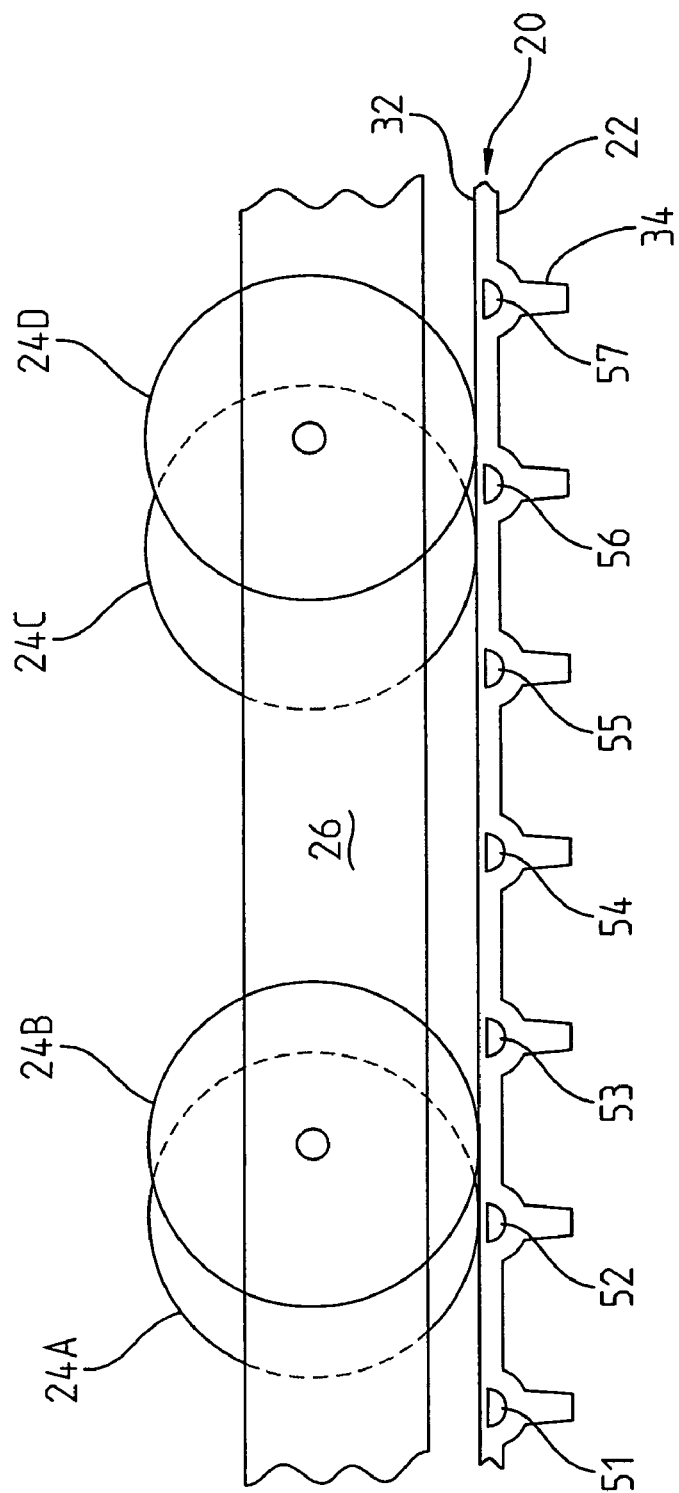
FIG. 6 shows a side view of staggered bogie wheel suspension system in accordance with an embodiment of the invention.

FIG. 6 is a side view of the embodiment shown in FIG. 5(c). FIG. 6 illustrates how the appropriate selection of front and rear bogie wheel offset W6, W1 and front-to-rear bogie wheel spacing W4 enables the noise and vibration caused by bogie wheel/track rod impact to be distributed in time, thereby lessening the overall noise level generated.

A sequence of events that may distribute noise from bogie wheel/track rod impact may begin, for example, with the situation depicted in FIG. 6. In FIG. 6, track rod 52 is impacting bogie wheel 24A. As the endless track 20 continues to move relative to the bogie wheels 24A–24D, the sequence of bogie wheel/track rod impacts is as follows:

track rod 56 impacts bogie wheel 24D;
track rod 52 impacts bogie wheel 24B;
track rod 55 impacts bogie wheel 24C;
track rod 51 impacts bogie wheel 24A;
track rod 55 impacts bogie wheel 24D;
track rod 51 impacts bogie wheel 24B;
track rod 54 impacts bogie wheel 24C;
etc.

Thus, the sequence of track rod impacts described above is one example of distributing the track rod impacts in time in order to lessen the effect of the noise and vibration caused thereby. Sequences other than that shown and described above may be obtained by utilizing different wheel spacings and offsets which may also serve to distribute the noise and vibration from track rod impacts. Such sequences will be apparent to one of ordinary skill in the art and are thus within the scope of the invention.

In addition to distributing the track rod impacts in time, the embodiment of the invention shown in FIG. 6 has the additional advantage of distributing the track rod impacts spatially. In particular, according to one embodiment of the invention, the track rods alternate between impacting a front and a rear bogie wheel on successive impacts. This may further lessen the noise and vibration generated and transmitted to an operator or passenger during snowmobile operation, and may improve drivetrain efficiency.

Figure 7B:
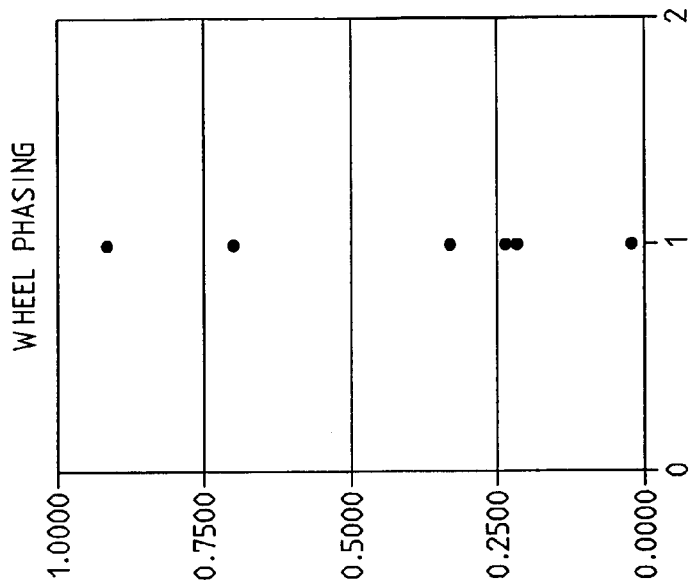
FIGS. 7 (*a*) and (*b*) illustrate a technique for reducing noise and vibration in an endless track vehicle according to an embodiment of the invention.
Figure 7A:
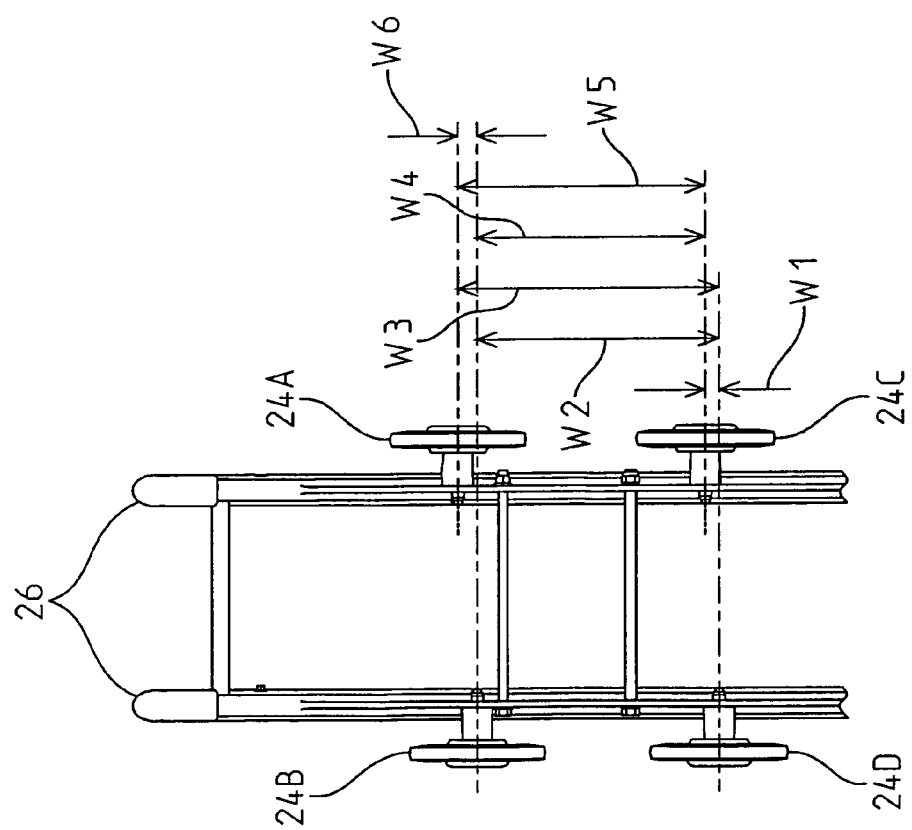

FIGS. 7(a) and (b) illustrate a method for reducing noise and vibration from track rod impacts in a suspension with four bogie wheels. As shown in FIG. 7(a), a staggered bogie wheel arrangement with four bogie wheels results in a total of six longitudinal wheel spacings, W1–W6, which can be evaluated with respect to a track rod spacing, TR, according to an embodiment of the invention.

The measurement of interest in evaluating each wheel spacing is referred to herein as the "phase difference." Throughout this disclosure, "phase difference" is defined as the remainder (the non-integer, fractional portion) of the quotient formed by dividing each wheel spacing W1–W6 by the track rod spacing TR. For example, FIG. 7(b) shows a plot of the phase difference for each wheel spacing W1–W6 and a track rod spacing TR for the track design described in the following example. The phase difference for each wheel spacing is shown below in bold text in the right-hand column.

EXAMPLE

| TR = 2.52 | W1 = 0.550 | W1/TR = 0.2183 | 0.2183 |
|---|---|---|---|
| | W2 = 9.865 | W2/TR = 3.9147 | 0.9147 |
| | W3 = 10.675 | W3/TR = 4.2361 | 0.2361 |
| | W4 = 9.315 | W4/TR = 3.6964 | 0.6964 |
| | W5 = 10.125 | W5/TR = 4.0179 | 0.0179 |
| | W6 = 0.810 | W6/TR = 0.3214 | 0.3214 |

FIG. 7(b) graphically illustrates that, for the particular track rod spacing and wheel spacing values illustrated, none of the phase differences are equal to either 0.00 or 1.00, which are equivalent to each other and which correspond to two wheels being perfectly "in phase" with each other (i.e., an exact integer number of track rod spacings TR between two given bogie wheels). Therefore, a value of 0.00 or 1.00 corresponds to the condition of simultaneous track rod/bogie wheel impact. FIG. 7(b) also illustrates that no two phase differences are equal for the particular track rod spacing and wheel spacing values selected, which reduces the effect of harmonic noise. Further, none of the phase differences illustrated in the above table and in FIG. 7(b) form second, third, or fourth order harmonics. Such harmonics might result, for example, from having phase differences with values of 0.5 (second order harmonic), 0.333 and 0.667 (third order harmonic), and 0.25 with 0.50 and 0.0.75 (fourth order harmonic). Such harmonic noise may have the potential to worsen the noise and vibration created by track rod impacts with bogie wheels.

Hence, the method illustrated above can be used to evaluate a given set of bogie wheel locations for the presence of simultaneous track rod impacts, as well as the noise and vibration from associated harmonics. As would be appreciated by a person of ordinary skill in the art, the method illustrated can be applied to bogie wheel suspension systems having any number of bogie wheels and any staggered wheel arrangement without departing from the scope of the invention.

Figure 8A:
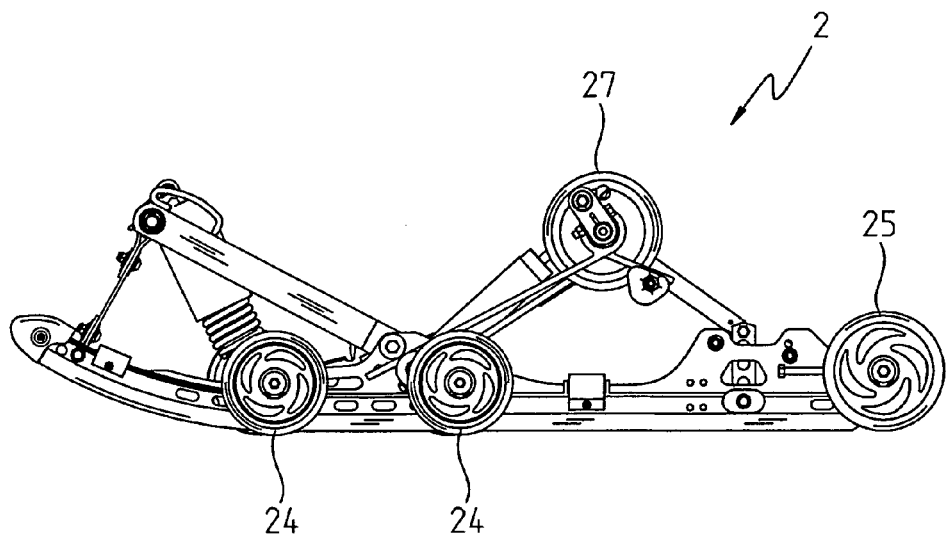
FIGS. 8 (*a*) and (*b*) show a side and top view, respectively, of an endless track unit for a snowmobile according to an embodiment of the invention.

FIGS. 8(a) and (b) are a side view and top view, respectively, of an endless track unit 2 according to an embodiment of the invention.

Although embodiments of the invention have been described with respect to pairs of lower forward bogie wheels 24, embodiments of the invention can be applied to other suspension wheels without departing from the scope of the invention. For example, in a suspension wheel such as carrier wheel 27 in FIG. 8(a), the point of track rod impact occurs when the track rod travels over and is aligned above carrier wheel 27. As would be appreciated by one of ordinary skill in the art, a plurality of carrier wheels 27 may be staggered to achieve the benefits of noise reduction and improved drive train efficiency, and would fall within the scope of the invention.

Figure 8B:
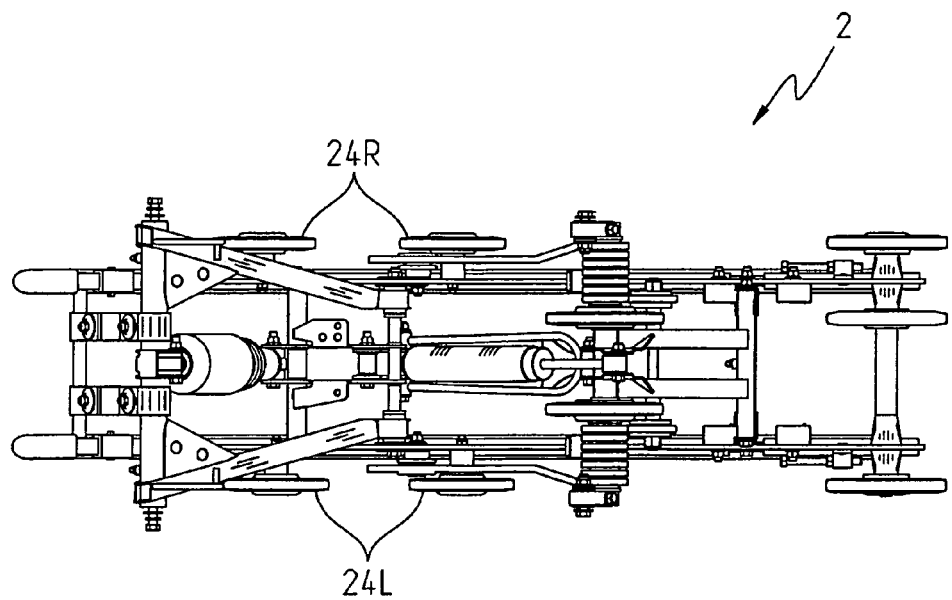

FIG. 8(b) shows an embodiment of the invention in which each of the "right side" bogie wheels 24R are longitudinally offset slightly forward of each of the corresponding "left side" bogie wheels 24L. However, one skilled in the art would quickly recognize other configurations which are within the scope of the invention. Such configurations might include, for example, having each of the left side bogie wheels 24L longitudinally offset slightly forward of each of the corresponding right side bogie wheels 24R, or alternatively, having one of the left side bogie wheels 24L offset forward and the other left side bogie wheel 24L offset rearward from their corresponding right side bogie wheels.

Figure 9:
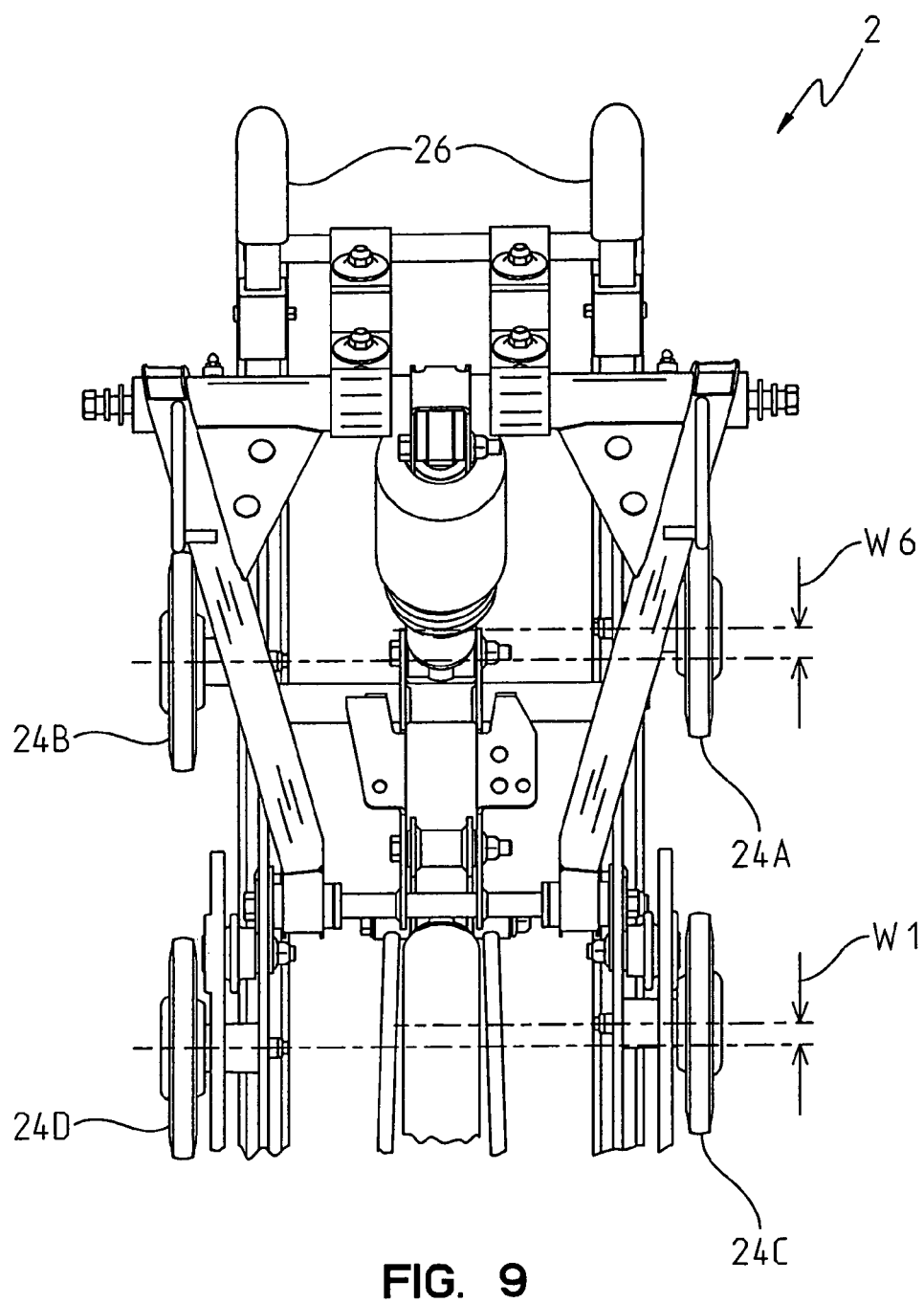
FIG. 9 shows an enlarged top view of an endless track unit for a snowmobile according to an embodiment of the invention.

FIG. 9 is an enlarged top view of a portion of an endless track unit 2, showing the relative magnitudes of the front bogie wheel offset W6 and the rear bogie wheel offset W1. For example, FIG. 9 shows an embodiment of the invention in which the front bogie wheel offset W6 is greater than the rear bogie wheel offset W1. As would be appreciated by a person of ordinary skill in the art, the magnitude difference could be reversed (i.e., the rear bogie wheel offset W1 could be greater than the front bogie wheel offset W6) without departing from the scope of the invention.

Figure 10:
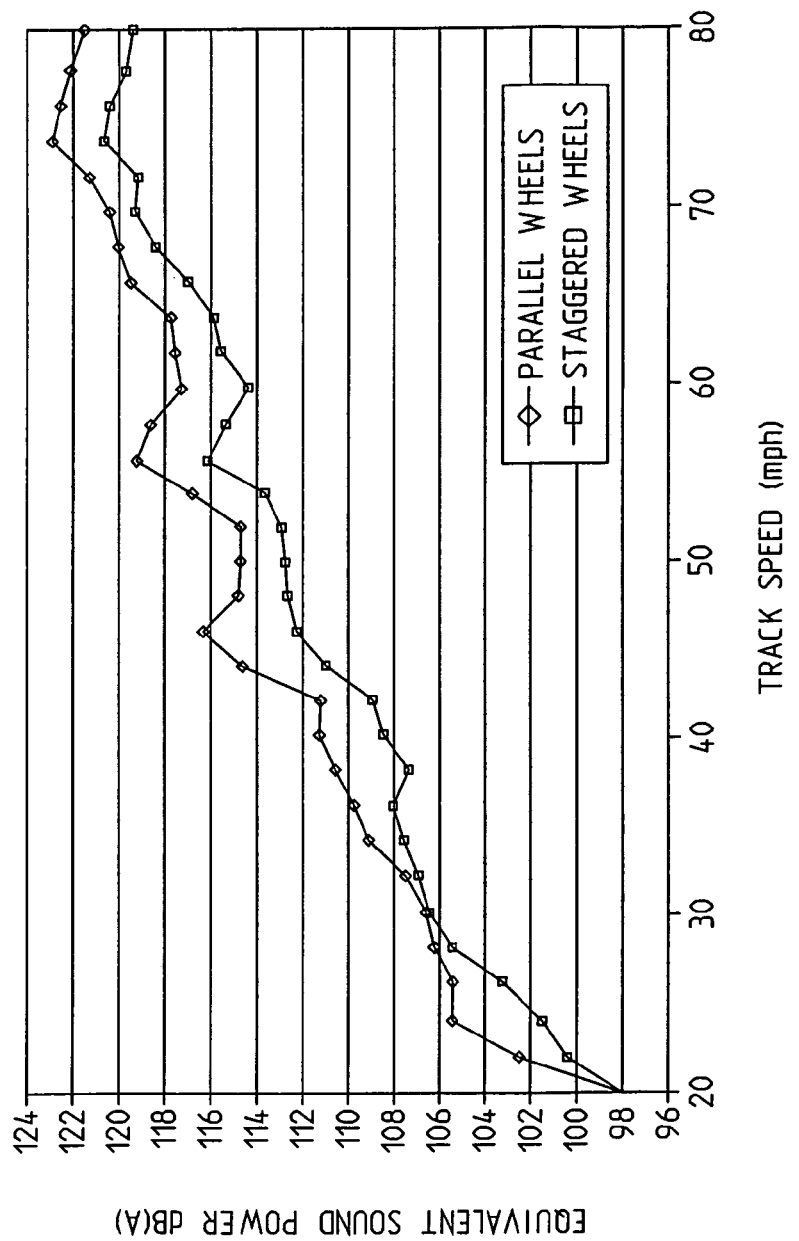
FIG. 10 is a plot of noise level versus speed for a snowmobile according to an embodiment of the invention.

FIG. 10 illustrates noise measurement results obtained from an embodiment of the invention compared to a traditional "parallel wheel" configuration (in which there is no longitudinal staggering of corresponding left-hand and right-hand bogie wheels). FIG. 10 indicates that there tends to be a general increase in noise level as the track speed increases, regardless of wheel configuration, but that the staggered wheel configuration according to an embodiment of the invention produces a consistently lower level of noise throughout the range of track speeds tested than does the parallel wheel configuration.

Thus, embodiments of the STAGGERED BOGIE WHEEL TRACK SUSPENSION are disclosed. One skilled in the art will appreciate that the invention can be practiced with embodiments other than those disclosed. The disclosed embodiments are presented for purposes of illustration and not limitation, and the invention is limited only by the claims that follow.

What is claimed is:

1. An endless track vehicle, comprising:
   a chassis;
   an engine disposed on the chassis; and
   a drive track assembly operatively connected to the engine for propulsion of the endless track vehicle, the drive track assembly comprising:
      a frame member suspended from the chassis,
      an endless track having a plurality of longitudinally spaced rods oriented transversely to a direction of travel of the endless track, and
      at least two bogie wheels rotatably mounted on the frame member for movably supporting the endless track in a longitudinal path around the frame member, and the at least two bogie wheels positioned such that no more than one bogie wheel is impacted by the longitudinally spaced rods at any one point in time during movement of the endless track in the longitudinal path around the frame member.

2. The endless track vehicle of claim 1, wherein a longitudinally spaced rod impacts a bogie wheel when the bogie wheel travels over a longitudinally spaced rod during movement of the endless track around the frame member.

3. The endless track vehicle of claim 1, wherein a longitudinally spaced rod impacts a bogie wheel when the longitudinally spaced rod travels over the bogie wheel during movement of the endless track around the frame member.

4. The endless track vehicle of claim 1, wherein a longitudinally spaced rod impacts a bogie wheel when a longitudinally spaced rod imparts vibrational energy to a bogie wheel during movement of the endless track around the frame member.

5. The endless track vehicle of claim 1, wherein the frame member further comprises,
   a rail oriented generally longitudinally, for rotatably mounting the at least two bogie wheels thereto.

6. The endless track vehicle of claim 1, wherein the frame member further comprises,
   at least two rails spaced apart laterally and oriented generally longitudinally,
   the at least two rails for rotatably mounting the at least two bogie wheels thereto.

7. The endless track vehicle of claim 6, wherein the at least two bogie wheels further comprise:
   two front bogie wheels, rotatably mounted toward a front portion of each of the at least two rails and spaced apart longitudinally by a front bogie wheel offset, and
   two rear bogie wheels, rotatably mounted toward a rear portion of each of the at least two rails and spaced apart longitudinally by a rear bogie wheel offset,
   wherein no more than one bogie wheel is impacted by the longitudinally spaced rods at any one point in time during movement of the endless track in the longitudinal path around the frame member.

8. The endless track vehicle of claim 7, wherein the longitudinally spaced rods are spaced apart longitudinally from one another by a substantially uniform rod spacing.

9. The endless track vehicle of claim 8, wherein the longitudinal spacing between any two bogie wheels, when divided by the rod spacing, produces a phase difference equal to the remainder of the quotient thus formed, wherein the phase difference is unique as compared to the phase differences obtained by dividing the longitudinal spacing of all other combinations of two bogie wheels by the rod spacing.

10. The endless track vehicle of claim 9, wherein the phase differences obtained by dividing the longitudinal spacing of all other combinations of two bogie wheels by the rod spacing do not include 0.500 to avoid noise from second order harmonics.

11. The endless track vehicle of claim 9, wherein the phase differences obtained by dividing the spacing of all other combinations of two bogie wheels by the rod spacing do not include 0.333 and 0.667 to avoid noise from third order harmonics.

12. The endless track vehicle of claim 9, wherein the phase differences obtained by dividing the spacing of all other combinations of two bogie wheels by the rod spacing do not include 0.25, 0.5, and 0.75 to avoid noise from fourth order harmonics.

13. The endless track vehicle of claim 9, wherein the longitudinally spaced rods alternately impact a bogie wheel mounted toward a forward portion of one of the rails and a bogie wheel mounted toward a rear portion of one of the rails.

14. An endless track vehicle, comprising:
   a chassis;
   an engine disposed on the chassis; and
   a drive track assembly operatively connected to the engine for propulsion of the endless track vehicle, the drive track assembly comprising:
      a frame member suspended from the chassis, the frame member comprising at least two rails spaced apart laterally and oriented generally longitudinally, an endless track having a plurality of longitudinally spaced rods oriented transversely to a direction of travel of the endless track, and at least two bogie wheels rotatably mounted on the at least two rails of the frame member for movably supporting the endless track in a longitudinal path around the frame member, and the at least two bogie wheels positioned such that no more than one longitudinally spaced rod impacts any one of the bogie wheels at any point in time during movement of the endless track in the longitudinal path around the frame member; the at least two bogie wheels comprising:

two front bogie wheels, rotatably mounted toward a front portion of each of the at least two rails and spaced apart longitudinally by a front bogie wheel offset, and two rear bogie wheels, rotatably mounted toward a rear portion of each of the at least two rails and spaced apart longitudinally by a rear bogie wheel offset, wherein no more than one longitudinally spaced rod impacts any one of the bogie wheels at any point in time during movement of the endless track in the longitudinal path around the frame member.

15. The endless track vehicle of claim 14, wherein the longitudinally spaced rods are spaced apart longitudinally from one another by a substantially uniform rod spacing.

16. The endless track vehicle of claim 15, wherein the longitudinal spacing between any two bogie wheels, when divided by the rod spacing, produces a phase difference equal to the remainder of the quotient thus formed, wherein the phase difference is unique as compared to the phase differences obtained by dividing the longitudinal spacing of all other combinations of two bogie wheels by the rod spacing.

17. The endless track vehicle of claim 16, wherein the phase differences obtained by dividing the longitudinal spacing of all other combinations of two bogie wheels by the rod spacing do not include 0.500 to avoid noise from second order harmonics.

18. The endless track vehicle of claim 16, wherein the phase differences obtained by dividing the spacing of all other combinations of two bogie wheels by the rod spacing do not include 0.333 and 0.667 to avoid noise from third order harmonics.

19. The endless track vehicle of claim 16, wherein the phase differences obtained by dividing the spacing of all other combinations of two bogie wheels by the rod spacing do not include 0.25, 0.5, and 0.75 to avoid noise from fourth order harmonics.

20. The endless track vehicle of claim 16, wherein the longitudinally spaced rods alternately impact a bogie wheel mounted toward a forward portion of one of the rails and a bogie wheel mounted toward a rear portion of one of the rails.

21. An endless track vehicle, comprising:
a chassis;
an engine disposed on the chassis; and
a drive track assembly operatively connected to the engine for propulsion of the endless track vehicle, the drive track assembly comprising:
a frame member suspended from the chassis,
an endless track having a plurality of longitudinally spaced rods oriented transversely to a direction of travel of the endless track, and at least two carrier wheels rotatably mounted on the frame member for movably supporting the endless track in a longitudinal path around the frame member, and the at least two carrier wheels positioned such that no more than one carrier wheel is impacted by the longitudinally spaced rods at any one point in time during movement of the endless track in the longitudinal path around the frame member.

22. A snowmobile, comprising:
a chassis,
an engine disposed on the chassis, and
a drive track assembly operatively connected to the engine for propulsion of the snowmobile, the drive track assembly comprising:
a frame member resiliently suspended from the chassis,
at least two bogie wheels rotatably mounted on the frame member for movably supporting an endless track in a longitudinal path around the frame member, the endless track having a ground-engaging outer surface and a plurality of longitudinally spaced track rods oriented transversely to the direction of travel of the endless track, and the at least two bogie wheels positioned such that no more than one bogie wheel is impacted by the longitudinally spaced track rods at any one point in time during movement of the endless track in the longitudinal path around the frame member.

23. The snowmobile of claim 22, wherein the frame member further comprises,
two suspension rails spaced apart laterally and oriented generally longitudinally, for rotatably mounting the at least two bogie wheels thereto.

24. The snowmobile of claim 23, wherein the two suspension rails are slide rails.

25. The snowmobile of claim 22, wherein the longitudinally spaced track rods are spaced apart longitudinally from one another by a substantially uniform track rod spacing.

26. The snowmobile of claim 25, wherein the longitudinal spacing between any two bogie wheels, when divided by the track rod spacing, produces a phase difference, the phase difference being unique as compared to the phase differences obtained by dividing the longitudinal spacing of all other combinations of two bogie wheels by the track rod spacing.

27. The snowmobile of claim 26, wherein the phase differences obtained by dividing the longitudinal spacing of all other combinations of two bogie wheels by the track rod spacing do not include 0.500 to avoid noise from second order harmonics.

28. The snowmobile of claim 26, wherein the phase differences obtained by dividing the longitudinal spacing of all other combinations of two bogie wheels by the track rod spacing do not include 0.333 and 0.667 to avoid noise from third order harmonics.

29. The snowmobile of claim 26, wherein the phase differences obtained by dividing the longitudinal spacing of all other combinations of two bogie wheels by the track rod spacing do not include 0.25, 0.5, and 0.75 to avoid noise from fourth order harmonics.

30. The snowmobile of claim 26, wherein the longitudinally spaced track rods alternately impact a bogie wheel mounted toward a forward portion of one of the suspension rails and a bogie wheel mounted toward a rear portion of one of the suspension rails.

31. The snowmobile of claim 23, wherein the at least two bogie wheels further comprise:

two front bogie wheels, rotatably mounted toward a front portion of each of the two suspension rails and spaced apart longitudinally by a front bogie wheel offset, and two rear bogie wheels, rotatably mounted toward a rear portion of each of the two suspension rails and spaced apart longitudinally by a rear bogie wheel offset, wherein no more than one longitudinally spaced track rod impacts the at least two bogie wheels at any one point in time during movement of the endless track in the longitudinal path around the frame member.

32. A snowmobile, comprising:

a chassis, an engine disposed on the chassis, and a drive track assembly operatively connected to the engine for propulsion of the snowmobile, the drive track assembly comprising:

a frame member resiliently suspended from the chassis, the frame member comprising two suspension rails spaced apart laterally and oriented generally longitudinally, at least two bogie wheels rotatably mounted on the two suspension rails of the frame member for movably supporting an endless track in a longitudinal path around the frame member, the at least two bogie wheels comprising:

two front bogie wheels, rotatably mounted toward a front portion of each of the two suspension rails and spaced apart longitudinally by a front bogie wheel offset, and two rear bogie wheels, rotatably mounted toward a rear portion of each of the two suspension rails and spaced apart longitudinally by a rear bogie wheel offset, the endless track having a ground-engaging outer surface and a plurality of longitudinally spaced track rods oriented transversely to the direction of travel of the endless track, and the at least two bogie wheels positioned such that no more than one longitudinally spaced track rod impacts any one of the bogie wheels at any point in time during movement of the endless track in the longitudinal path around the frame member, and no more than one longitudinally spaced track rod impacts any one of the bogie wheels at any point in time during movement of the endless track in the longitudinal path around the frame member.

33. A snowmobile, comprising:

a chassis, an engine disposed on the chassis, and a drive track assembly operatively connected to the engine for propulsion of the snowmobile, the drive track assembly comprising:

a frame member resiliently suspended from the chassis, at least two bogie wheels rotatably mounted on the frame member for movably supporting an endless track in a longitudinal path around the frame member, the endless track having a ground-engaging outer surface and a plurality of longitudinally spaced track rods oriented transversely to the direction of travel of the endless track, and the at least two bogie wheels positioned such that no more than one longitudinally spaced track rod impacts the at least two bogie wheels at any one point in time during movement of the endless track in the longitudinal path around the frame member, the longitudinally spaced track rods being spaced apart longitudinally from one another by a substantially uniform track rod spacing.

34. The snowmobile of claim 33, wherein the longitudinal spacing between any two bogie wheels, when divided by the track rod spacing, produces a phase difference, the phase difference being unique as compared to the phase differences obtained by dividing the longitudinal spacing of all other combinations of two bogie wheels by the track rod spacing.

35. The snowmobile of claim 34, wherein the phase differences obtained by dividing the longitudinal spacing of all other combinations of two bogie wheels by the track rod spacing do not include 0.500 to avoid noise from second order harmonics.

36. The snowmobile of claim 34, wherein the phase differences obtained by dividing the longitudinal spacing of all other combinations of two bogie wheels by the track rod spacing do not include 0.333 and 0.667 to avoid noise from third order harmonics.

37. The snowmobile of claim 34, wherein the phase differences obtained by dividing the longitudinal spacing of all other combinations of two bogie wheels by the track rod spacing do not include 0.25, 0.5, and 0.75 to avoid noise from fourth order harmonics.

38. The snowmobile of claim 34, wherein the longitudinally spaced track rods alternately impact a bogie wheel mounted toward a forward portion of one of the suspension rails and a bogie wheel mounted toward a rear portion of one of the suspension rails.

39. An endless track vehicle, comprising:

a chassis;

an engine disposed on the chassis; and a drive track assembly operatively connected to the engine for propulsion of the endless track vehicle, the drive track assembly comprising:

a frame member suspended from the chassis, an endless track having a plurality of longitudinally spaced rods oriented transversely to a direction of travel of the endless track, and at least two bogie wheels rotatable mounted on the frame member for movably supporting the endless track in a longitudinal path around the frame member, and the at least two bogie wheels positioned such that no more than one longitudinally spaced rod impacts the at least two bogie wheels at any one point in time during movement of the endless track in the longitudinal path around the frame member, the frame member further comprising, at least two rails spaced apart laterally and oriented generally longitudinally, the at least two rails for rotatably mounting the at least two bogie wheels thereto, the at least two bogie wheels further comprising:

two front bogie wheels, rotatably mounted toward a front portion of each of the at least two rails and spaced apart longitudinally by a front bogie wheel offset, and two rear bogie wheels, rotatably mounted toward a rear portion of each of the at least two rails and spaced apart longitudinally by a rear bogie wheel offset, wherein no more than one longitudinally spaced rod impacts the at least two bogie wheels at any one point in time during movement of the endless track in the longitudinal path around the frame member.

40. The endless track vehicle of claim 39, wherein the longitudinally spaced rods are spaced apart longitudinally from one another by a substantially uniform rod spacing.

41. The endless track vehicle of claim 40, wherein the longitudinal spacing between any two bogie wheels, when divided by the rod spacing, produces a phase difference equal to the remainder of the quotient thus formed, wherein the phase difference is unique as compared to the phase differences obtained by dividing the longitudinal spacing of all other combinations of two bogie wheels by the rod spacing.

42. The endless track vehicle of claim 41, wherein the phase differences obtained by dividing the longitudinal spacing of all other combinations of two bogie wheels by the rod spacing do not include 0.500 to avoid noise from second order harmonics.

43. The endless track vehicle of claim 41, wherein the phase differences obtained by dividing the spacing of all other combinations of two bogie wheels by the rod spacing do not include 0.333 and 0.667 to avoid noise from third order harmonics.

44. The endless track vehicle of claim 41, wherein the phase differences obtained by dividing the spacing of all other combinations of two bogie wheels by the rod spacing do not include 0.25, 0.5, and 0.75 to avoid noise from fourth order harmonics.

45. The endless track vehicle of claim 41, wherein the longitudinally spaced rods alternately impact a bogie wheel mounted toward a forward portion of one of the rails and a bogie wheel mounted toward a rear portion of one of the rails.

46. A snowmobile, comprising:
a chassis,
an engine disposed on the chassis, and
a drive track assembly operatively connected to the engine for propulsion of the snowmobile, the drive track assembly comprising:
a frame member resiliently suspended from the chassis,
at least two bogie wheels rotatably mounted on the frame member for movably supporting an endless track in a longitudinal path around the frame member, the endless track having a ground-engaging outer surface and a plurality of longitudinally spaced track rods oriented transversely to the direction of travel of the endless track, and the at least two bogie wheels positioned such that no more than one longitudinally spaced track rod impacts the at least two bogie wheels at any one point in time during movement of the endless track in the longitudinal path around the frame member, the frame member further comprising, two suspension rails spaced apart laterally and oriented generally longitudinally, for rotatable mounting the at least two bogie wheels thereto the at least two bogie wheels further comprising:
two front bogie wheels, rotatably mounted toward a front portion of each of the two suspension rails and spaced apart longitudinally by a front bogie wheel offset, and
two rear bogie wheels, rotatably mounted toward a rear portion of each of the two suspension rails and spaced apart longitudinally by a rear bogie wheel offset,
wherein no more than one longitudinally spaced track rod impacts the at least two bogie wheels at any one point in time during movement of the endless track in the longitudinal path around the frame member.

* * * * *